March 23, 1954  A. J. FAUSEK ET AL  2,672,891

PRESSURE REGULATOR

Filed Feb. 7, 1948

INVENTORS
ARTHUR J. FAUSEK
IRWING F. FAUSEK
BY
ATTORNEY

Patented Mar. 23, 1954

2,672,891

UNITED STATES PATENT OFFICE 2,672,891

PRESSURE REGULATOR

Arthur J. Fausek and Irwing F. Fausek,
Clayton, Mo.

Application February 7, 1948, Serial No. 6,858

3 Claims. (Cl. 137—791)

This invention relates generally to pressure regulators, or reducing valves, and more specifically to apparatus of this type adapted for use in reducing the pressures of gases and other fluids, the predominant object of the invention being to provide a regulator, or reducing valve, which is of such improved construction and arrangement that the pressure of a gas or other fluid passing through the apparatus may be reduced by successive stages so as to reduce the gas from a relatively high pressure to a constant, non-fluctuating low working pressure such as is required for use in an oxy-acetylene cutting or welding torch.

As is generally well known by persons familiar with such matters gases employed in the operation of oxy-acetylene torches are contained in tanks under high pressure, usually 2,000 lbs. per square inch, and said gases are delivered to the torches at a working pressure of from 1 to 150 lbs. per square inch. It has been found that when the pressures of gases employed in operating oxy-acetylene torches are reduced in a single step, from their original high pressures to the very low working pressures required, that unstable flames at the tips of the torches are frequently produced due to fluctuation of the working pressures of the gases delivered to the torches. By providing a regulator, or reducing valve in which the pressures of the gases are reduced in successive stages unstable flames at the tips of the torches are entirely eliminated and constant non-fluctuating flames are produced at the torch tips which greatly increase the efficiency of the torches and improve the work done therewith.

One important object of the present invention is to provide a pressure regulator of the type referred to above, the body portion of which is of one piece, integral construction, as distinguished from the body portions of certain previously known multi-stage pressure regulators which were comprised of a plurality of parts assembled and secured together.

Another important object of the present invention is to provide the pressure regulator hereof with improved means for signaling the fact that excessively high pressure is present in the high-pressure chamber of the regulator.

Still another important object of this invention is to provide improved means for securing in place in the regulator structure a diaphragm which constitutes a part of the regulator.

Figures 1, 2, 3, 4, 5, 6:
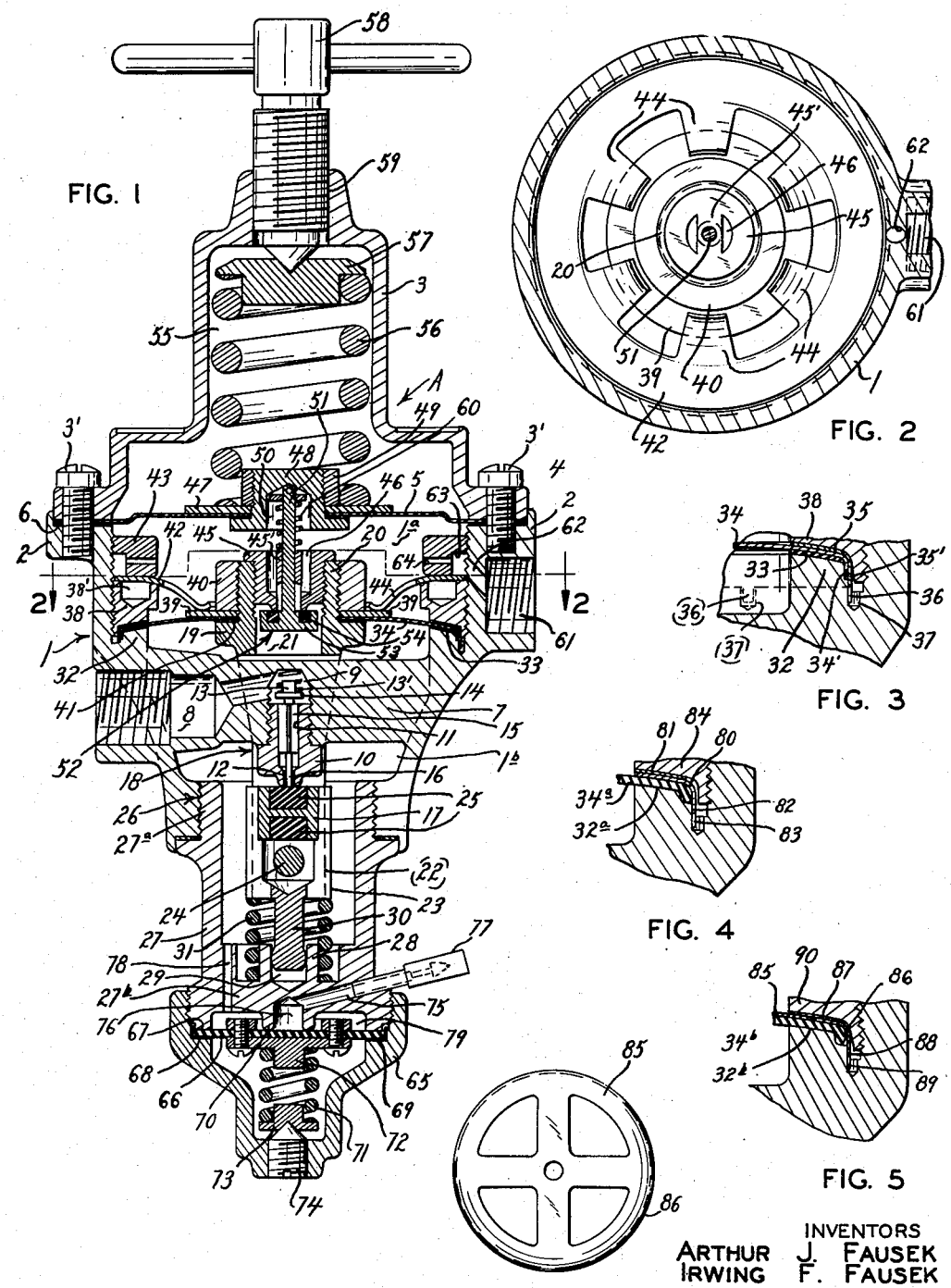
Fig. 1 is a vertical section taken through the improved regulator.
Fig. 2 is a horizontal section taken on line 2—2 of Fig. 1.
Fig. 3 is an enlarged, fragmentary, vertical section illustrating the manner of securing in place in the structure a diaphragm which forms a part of the improved regulator.
Fig. 4 is a modified form of the arrangement shown in Fig. 3.
Fig. 5 is another modified form of the arrangement shown in Fig. 3.
Fig. 6 is a plan view, on a reduced scale, of a yoke guide which forms a part of the structure shown in Fig. 5.

In the drawing, wherein are shown for purposes of illustration, merely, several embodiments of the invention, A designates in Fig. 1 the improved pressure regulator generally. The regulator A includes a body portion 1 which is in the form of a one-piece, integral structure, said body portion being provided at its upper end with an annular, outwardly extended flange 2. Mounted on the body portion 1 of the regulator A is a dome 3 which is provided at its lower end with an annular, outwardly extended flange 4, and interposed between the flange 2 of the body portion 1 and the flange 4 of the dome 3 is the edge portion of a diaphragm 5 which separates the interior of the body portion from the interior of the dome, a gasket 6 being associated with said edge portion of the diaphragm 5 as is shown in Fig. 1, and the dome and body portion being secured together by fastening devices 3'. The body portion 1 is provided with an interior cavity which constitutes the low pressure chamber 1a of the regulator, the diaphragm 5 providing the top wall of said low pressure chamber 1a. Extended transversely of the body portion of the regulator is a bridge portion 7 which is an integral part of the body portion 1, said bridge portion being relatively narrow when compared with the inner diameter of the body portion 1 so that gas may flow upwardly around the opposite sides of the bridge portion.

Formed longitudinally in the bridge portion 7 is an inlet passageway 8 which is screwthreaded at its outer end to receive a connection (not shown). The inlet passageway communicates at its inner end with a cavity 9 which is formed vertically in the bridge portion at the approximate center thereof, and this cavity is screwthreaded through its lower portion so as to screwthreadedly receive a nozzle 10. The nozzle 10 includes an enlarged lower portion and a screwthreaded upper portion which is screwed into the screwthreaded lower portion of the cavity 9, and said nozzle is provided with an opening 11 formed therein which terminates at the bottom of the nozzle in a discharge aperture 12 of reduced diameter. Associated with the nozzle 10 is a check valve 13 which includes a valve head 14, a valve guiding portion 15 and a stem 16. The valve head, guiding portion, and stem of the check valve are of integral structure, the guiding portion being shaped so that faces thereof contact slidingly with the wall of the opening 11 of the nozzle to guide the check valve during movement thereof. As shown in Figs. 1 and 2 the stem 16 is of substantially less diameter than the discharge opening 12 of the nozzle through which said stem extends so that gas may pass through said discharge opening.

Arranged in cooperating relation with respect to the discharge end of the nozzle 10 is a closure element 17 which is supported by a yoke 18. The yoke 18 is provided with an upper bridge portion 19 which includes an upwardly projected, exteriorly screwthreaded extension 20, said extension 20 being provided with a vertical opening 21 formed therein, the wall of which is screwthreaded at the upper end portion of said opening. Also the yoke 18 includes a pair of spaced legs 22 which extend downwardly from the bridge portion of the yoke. The closure element 17 is disposed within a split member 23, the spaced legs 22 of the yoke and portions of the member 23 being provided with alined openings through which a fastening device 24 is extended. The closure element supports a plurality of seats 25 and when one of said seats which has been in the effective position becomes worn, or is broken or otherwise impaired, the closure element and the associated member 23 may be removed from between the legs of the yoke 18, after which the closure element may be repositioned to locate another of the seats in the effective position, and the closure element and member 23 are replaced between the legs of the yoke.

The lower end portion of the body portion 1 of the regulator A is provided with a screwthreaded opening 26 that receives the exteriorly screwthreaded upper portion 27a of an element 27. The element 27 embraces the lower portions of the spaced legs of the yoke, the closure element 17, and the member 23, and said element is provided with a bottom wall 27b which is provided with an upwardly projected extension 28 which has an opening 29 formed therein. The opening 29 referred to receives a downwardly extended portion 30 which forms a part of the member 23, said portion 30 including a head which contacts with the wall of the opening 29 so as to guide the lower end portion of the yoke and the parts associated therewith when the yoke is subjected to vertical movement as will presently appear herein. The structure at the lower end of the yoke 18 includes a coilspring 31 which contacts at its opposite ends with the lower face of the member 23 and an upper face portion of the bottom wall of the element 27.

The wall of the low pressure chamber 1a within the body portion 1 is screwthreaded and said body portion is provided with an annular upstanding flange 32 which is located inwardly of the lower portion of the screwthreaded wall of the low pressure chamber 1a of the body portion 1, the annular top face of said flange 32 being inclined outwardly and downwardly, as is shown in Fig. 1. Arranged in contact with the inclined top face of the flange 32 is a gasket 33 which is formed of suitable compressible, sealing material, the top face of said gasket receiving in contact therewith the edge portion of a diaphragm 34. By referring to Fig. 3 it will be noted that the diaphragm 34 is provided at its margin with a downturned, annular flange 34', the outer face of the annular flange 32 being recessed to receive said annular flange 34' of the diaphragm 34.

The edge portion of the diaphragm 34 has arranged in contact with its top face an annular member 35 which is provided with a downturned, annular flange 35', said flange 35' of said annular member 35 being provided with downwardly extended, circumferentially spaced fingers 36 which extend into spaced apertures 37 formed in the body portion 1 of the regulator to prevent rotation of said annular member when the clamping ring is rotated to clamp the diaphragm in place. The diaphragm 34 is secured in place within the body portion of the regulator by a clamping ring 38 which is exteriorly screwthreaded and screwthreadedly engages the interiorly screwthreaded wall of the upper portion of the body portion 1. The clamping ring 38 is screwed downwardly into tight, clamping engagement with the top face of the annular member 35, whereby the edge portion of the diaphragm is tightly gripped between said annular member 35 and the gasket 33. The annular member 35 is preferably formed of stainless steel, or other suitable material which will permit the clamping ring to slide freely in contact with said annular member when said clamping ring is being adjusted to its diaphragm clamping position. Also, the clamping action provided by the clamping ring 38 compresses the gasket 33 and thereby provides a fluid-tight joint between the lower face of the diaphragm and the top face of the annular flange 32. The clamping ring 38 is provided with apertures 38' which permit of a spanner wrench being employed for rotating said clamping ring.

The diaphragm 34 is provided with a centrally located opening formed therein through which the screwthreaded extension 20 of the yoke 18 extends. Also, the diaphragm 34 has associated with it a disk 39, said disk contacting with the top face of the diaphragm 34 and having a centrally located opening which is alined with the central opening of the diaphragm through which the extension 20 of the yoke extends. The yoke 18 is secured to the diaphragm 34 and to the disk 39 by a nut 40 which is screwed on the screwthreaded extension 20 of the yoke so as to clamp the diaphragm and the disk between the lower face of said nut and a shoulder formed on the yoke, a gasket 41 being interposed between the lower face of said diaphragm 34 and said shoulder of the yoke. Additionally, the diaphragm 34 and the disk 39 have associated with them a leaf spring structure 42 having an outer, annular portion which is clamped between the top face of the clamping ring 38 and the bottom face of a second clamping ring 43, said leaf spring structure having inwardly and downwardly extended spring fingers 44 which contact at their inner ends with the disk 39. The spring fingers of the leaf spring structure 42 tend to move the yoke 18 and the parts associated therewith in a downward direction.

Supported by the extension 20 of the yoke 18 is a nozzle 45 which includes a screwthreaded portion that is screwed into the screwthreaded upper portion of the opening 21 formed in said extension 20. The nozzle 45 is provided with an enlarged upper end the lower face of which contacts with the top face of the extension 20 and a passageway 46 is formed vertically through said nozzle, said nozzle being provided at its lower end with an annular valve seat. The space immediately above the diaphragm 34 constitutes the low pressure chamber 1a of the regulator and the top wall of this low pressure chamber is provided by the diaphragm 5, as has been previously mentioned herein.

Arranged in contact with the top face of the diaphragm 5 is a disk 47, said disk and the diaphragm 5 being provided with alined centrally located apertures. Associated with the diaphragm 5 is a connecting member 48 which includes a screw-threaded shank portion that extends through the alined apertures of said diaphragm 5 and the disk 47, said connecting member being provided also with a lower annular portion whose upper face contacts with the lower face of the diaphragm. The screwthreaded shank portion of the connecting member 48 has mounted thereon a nut 49 which is screwed downwardly on said shank portion so as to clamp the diaphragm 5 and the disk 47 to the connecting member 48. The connecting member 48 is provided with an opening 50, the top wall of which engages the upper end of a stem 51 forming a part of a closure element 52, said closure element 52 including an enlarged, lower head portion 53 which is located in the opening 21 of the extension 20 of the yoke 18. The stem 51 passes through the passageway 46 in the nozzle 45, said stem being of considerably less diameter than said passageway so that gas may pass through the passageway, and said stem being supported and guided by a guide element 45'. The head 53 of the closure element has formed in its top face an annular depression in which an annular valve seat 54 is arranged, said valve seat being adapted, on vertical movement of the valve head 53, to move into and out of contact with the annular valve seat formed at the lower end of the nozzle 45.

The dome 3 is provided with an opening 55 in which a coilspring 56 is disposed, said coilspring contacting at its upper end with a suitable spring seat 57 and at its lower end with the disk 47 associated with the diaphragm 5. In order to regulate the tension of the coilspring 56 a hand screw 58 is provided. This hand screw is screwthreadedly mounted in a screwthreaded opening 59 formed in the upper portion of the dome 3 and has a conical lower end portion which is disposed in a correspondingly shaped depression formed in the spring seat 57. Also a smaller coilspring 60 is arranged in association with the closure element 52, the upper end of said coilspring being in contact with a pin supported by the upper portion of the stem 51 of the closure element 52, and the lower end of said coilspring being seated in contact with the top face of the guide element 45'.

The body portion 1 of the regulator A is provided with a screwthreaded opening 61 that is adapted to receive a suitable gas discharge connection (not shown), there being a passageway 62 formed through the wall of said body portion which communicates at its inner end with an annular gas passageway 63 formed in the clamping ring 43 and at its outer end with said opening 61. Also, the clamping ring 43 has formed therein a plurality of gas passageways 64 which place the low pressure chamber 1a in communication with the annular gas passageway 63 of said clamping ring 43 so that gas may be withdrawn from said low-pressure chamber 1a by way of the passageway 62 and a discharge connection which is screwed into the opening 61.

The element 27 is exteriorly screwthreaded at its lower end and this screwthreaded portion of said element receives a cap 65 which serves to close the lower end of said element 27. A diaphragm 66 is arranged within the cap 65 and its marginal portion is clamped between an annular portion 67 of the element 27 and an annular face 68 of the cap, a gasket 69 being interposed between the annular face 68 of the cap 65 and a portion of the lower face of the diaphragm 66. The top face of the diaphragm normally contacts with the lower face of an annular valve seat 70 which extends downwardly from the bottom wall of the element 27, there being present a coil spring 71 which normally serves to force the top face of said diaphragm against said annular valve seat 70. At its upper end the coil spring 71 engages a spring seat 72 which is secured to the diaphragm 66, and at its lower end said coil spring 71 engages a spring seat 73, said spring seat 73 being associated with an adjusting screw 74 which is mounted in the lower portion of the cap 65 and serves to regulate the tension of the coil spring 71. The bottom wall of the element 27 is provided with a passageway 75 which communicates at its inner end with a cavity 76 located within the annular valve seat 70, and at its outer end this passageway 75 receives a device 77, a whistle, for instance, which is adapted to give off an audible signal on passage of gas through said device. Additionally, the bottom wall of the element 27 has formed vertically therethrough a gas passageway 78 which communicates at its upper end with the interior portion of said element that is located above the bottom wall thereof, and at its lower end with an annular cavity 79 which is located immediately above the diaphragm 66.

In the operation of the improved regulator, gas under high pressure enters the inlet passageway 8 and when the check valve 14 is unseated, or is raised upwardly from the top face of the nozzle 10, said gas passes downwardly of the nozzle 10 through the passageways therein. When the closure element 17 is lowered so as to space the effective seat 25 of said closure element downwardly with respect to the lower discharge end of the nozzle 10 the gas passes through the discharge opening 12 of the nozzle 10 and is discharged into the high pressure chamber 1b of the regulator. The leaf spring structure 42 tends to move the diaphragm 34, yoke 18 and closure element 17 downwardly so as to remove the effective seat 25 of the closure element from the nozzle 10, and the gas pressure within the high pressure chamber 1b acting against the under side of the diaphragm 34 tends to move said diaphragm, said yoke and said closure element upwardly against the action of the spring structure so as to force the effective seat 25 of the closure element against the lower end of the nozzle 10. Thus, the pressure of the spring structure 42 is opposed by the gas pressure acting against the under side of the diaphragm 34 and as a result of this situation the closure element moves toward and from the discharge end of the nozzle in response to these counteracting pressures so that pressure in the high pressure chamber 1b is maintained at a predetermined degree.

In like manner the downward pressure of the coilspring 56 acting against the diaphragm 5 tends to move said diaphragm and the closure element 52, downwardly so as to move the seat 54 carried by the head 53 of the closure element away from the lower end of the nozzle 45. This permits gas to move from the high pressure chamber 1b past the head of 53 of the closure element 52, through the passageway 46 in the nozzle 45 and into the low pressure chamber 1a wherein the gas pressure acts against the underside of the diaphragm 5 and thereby permits the coilspring 60 to move the closure element upwardly so as to force the seat 54 thereof against the lower end of the nozzle 45. Here again counteracting pressures are produced by the coilspring 56 and the gas pressure within the low pressure chamber 1a which causes the head of the closure element 52 to reciprocate toward and from the lower discharge end of the nozzle 45 whereby the pressure of gas in the low pressure chamber is maintained at a predetermined degree. From the low pressure chamber the gas therein passes through the discharge passageway 62 to a welding or cutting torch, or other device with which the gas is used, at a constant, non-fluctuating working pressure, which, in the use of the gas with a torch, produces the desired stable non-fluctuating flame at the tip of the torch.

The purpose of providing the regulator A with the check valve 13 is to prevent a sudden rush of high pressure fluid into the regulator at a time when the closure element 17 is spaced a considerable distance from the discharge end of the nozzle 10, or when the effective seat 25 of the closure element has been destroyed, as such sudden rush of high pressure fluid into the regulator might rupture the diaphragm 34, or the effective seat 25 of the closure element 17 might be brought into contact with the discharge end of the nozzle with such sudden force as to fracture the breakable seat, or the high pressure fluid itself might destroy the effective seat 25 of the closure element 17 because of the violence of its movement thereagainst. Also, such high pressure might be built up within the body of the regulator as to cause an explosion within the regulator. The stem of the check valve 13 contacts with the effective seat 25 of the closure element, and because of the presence of the coilspring 13' which forces said stem against said effective seat 25 the check valve acts in consonance with the closure element in an opposite manner as the closure moves toward and from the lower discharge end of the nozzle 10. Thus, the free passage of high pressure fluid from the nozzle 10 when the closure element 17 is spaced a considerable distance from the discharge end of the nozzle, or when the effective seat 25 of the closure element 17 has been destroyed, is prevented, and damage to the regulator caused by unrestricted discharge of high pressure fluid from the nozzle 10 is eliminated.

If, for any reason, in the operation of the improved regulator of this invention, excessively high pressure builds up within the high pressure chamber 1b, the diaphragm 66 will be flexed downwardly by such excessive pressure away from the annular valve seat 70. This will permit high pressure to pass through the cavity 76 and passageway 75 and escape through the signal device 77, an audible signal being given off by said signal device during passage of pressure therethrough.

In Fig. 4 a modified form of the manner of securing the diaphragm 34a in place within the regulator structure is illustrated. In accordance with the construction of Fig. 4 the diaphragm 34a is formed of rubber, or other similar material, and it is seated on an annular diaphragm seat 32a of the regulator body portion. An annular clamping element 80 contacts with the top face of a marginal portion of the diaphragm 34a, and a friction ring 81 contacts with a portion of the top surface of the clamping element 80. The clamping element 80 is provided with a downturned, annular flange 82, this flange 82 being provided with downwardly extended, circumferentially spaced fingers 83 which project into openings formed in the body portion of the regulator to prevent rotation of the annular clamping element when the clamping ring 84 is rotated to clamp the diaphragm in place.

In Fig. 5 another modified form of the manner of securing the diaphragm 34b in place within the regulator structure is illustrated. In this form of the invention the diaphragm 34b is formed of rubber, or other similar material, and said diaphragm is seated on an annular diaphragm seat 32b forming part of the body portion of the regulator. A yoke guide 85 contacts with the top face of the diaphragm 34b, said yoke guide being shaped as is shown in Fig. 6 and being provided with a downturned, circumferential flange 86 which embraces a downturned, circumferential portion of the diaphragm 34b. Also, the structure of Fig. 5 includes an annular clamping element 87 which contacts with the top face of a marginal portion of the yoke guide 85, said clamping element having a downturned, circumferential flange 88 from which fingers 89 extend downwardly into openings formed in the body portion of the regulator so as to prevent rotation of the clamping element when the clamping ring 90 is rotated to clamp the diaphragm in place.

We claim:

1. In combination with a structure comprising a body portion provided with a diaphragm seat, a diaphragm, and means for securing said diaphragm in place with respect to said diaphragm seat, said diaphragm securing means comprising an annular element arranged above the top face of the marginal portion of the diaphragm which contacts with the diaphragm seat, and a clamping ring screwthreadedly supported by a screwthreaded portion of said body portion for clamping said marginal portion of said diaphragm and said annular element in place with respect to said diaphragm seat, said annular element being provided with a downturned circumferential flange from the lower edge of which a plurality of extensions are projected that are disposed in openings formed in the body portion of the structure.

2. In combination with a structure comprising a body portion provided with a diaphragm seat, a diaphragm, and means for securing said diaphragm in place with respect to said diaphragm seat, said diaphragm securing means comprising an annular element arranged above the top face of the marginal portion of the diaphragm which contacts with the diaphragm seat, and a screwthreaded clamping ring screwthreadedly supported by a screwthreaded portion of said body portion for clamping said marginal portion of said diaphragm and said annular element in place between said clamping ring and said diaphragm seat, said annular element being provided with a downturned circumferential flange from the lower edge of which a plurality of extensions are projected that are disposed in openings formed in the body portion of the structure.

3. In combination with a structure comprising a body portion provided with a diaphragm seat, a diaphragm, and means for securing said diaphragm in place with respect to said diaphragm seat, said diaphragm securing means comprising an annular element arranged above the top face of the marginal portion of the diaphragm which contacts with the diaphragm seat, and a screwthreaded clamping ring screwthreadedly supported by a screwthreaded portion of said body portion for clamping said marginal portion of said diaphragm and said annular element in place between said clamping ring and said diaphragm seat, said annular element being provided with a downturned circumferential flange from the lower edge of which a plurality of circumferentially spaced extensions are projected that are disposed in openings formed in the body portion of the structure.

ARTHUR J. FAUSEK.
IRWING F. FAUSEK.

References Cited in the file of this patent

UNITED STATES PATENTS

| Number | Name | Date |
|---|---|---|
| 116,669 | Blake | July 4, 1871 |
| 1,034,323 | Tanner | July 30, 1912 |
| 1,297,239 | Potter | Mar. 11, 1919 |
| 1,521,765 | Gerrant | Jan. 6, 1925 |
| 2,061,905 | Hewitt | Nov. 24, 1936 |
| 2,094,191 | Sauzedde | Sept. 28, 1937 |
| 2,100,462 | Wellman | Nov. 30, 1937 |
| 2,156,823 | Stettner | May 2, 1939 |
| 2,160,849 | Fausek | June 6, 1939 |
| 2,208,149 | Vernet | July 16, 1940 |
| 2,306,768 | Wile | Dec. 29, 1942 |
| 2,319,659 | Cornes | May 18, 1943 |
| 2,354,283 | St. Clair | July 25, 1944 |

FOREIGN PATENTS

| Number | Country | Date |
|---|---|---|
| 281,388 | Italy | Jan. 12, 1931 |
| 328,844 | Germany | Nov. 6, 1920 |
| 489,121 | Germany | Jan. 14, 1930 |